June 24, 1941.   J. G. HEASLET   2,246,627
TRACTOR CONSTRUCTION
Filed April 5, 1940

INVENTOR
JAMES G. HEASLET
BY George Douglas Jones
ATTORNEY

Patented June 24, 1941

2,246,627

UNITED STATES PATENT OFFICE 2,246,627

TRACTOR CONSTRUCTION

James G. Heaslet, Hudson, Ohio, assignor to The Cleveland Tractor Company, Cleveland, Ohio Application April 5, 1940, Serial No. 328,144

5 Claims. (Cl. 180—54)

This invention relates to the construction of tractors, and in particular, to the frame construction of such vehicles and the disposition of the other chassis components with respect to the frame.

A principal object of the present invention is to provide a tractor construction in which the rear or differential end for the driving wheels is detachably associated with rear end portions of a chassis frame.

As a further object it is intended to provide novel means for mounting the engine crank case directly on the frame.

Among the other objects is the provision of novel connecting means between the housing of the rear end and the frame, such that they may be readily separated from each other by simple longitudinal movement. This latter means permits the engine drive shaft to be disconnected with very little trouble.

Another feature of the invention consists in the arrangement of the engine, propeller or drive shaft, and transmission, and rear end housing means in a simple and efficient way which affords maximum clearance beneath the chassis frame and between the forward and rearward wheels of the tractor.

Further novel features of improvement contributing to ease and accuracy in operation of the tractor vehicle and also to the assembly thereof will be perceived and readily understood from reading the following detailed description of an illustrative embodiment of the invention in connection with the accompanying drawing, in which Fig. 1 is a side elevation of an agricultural type of wheeled tractor having certain parts broken away for clearness of disclosure;

Figure 1:
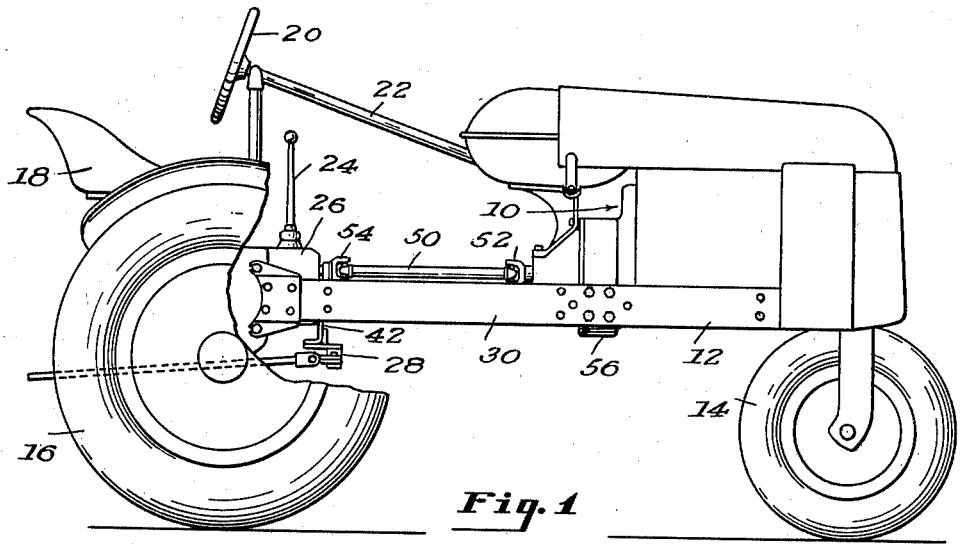

The drawing referred to above illustrates a three-wheeled agricultural type tractor comprising a suitable engine 10 carried by a generally rectangular chassis frame 12 of fabricated metal design, a front steerable wheel 14, and a pair of rear driving wheels 16, only one of which is shown. It is to be noted also that a seat 18 for the driver or operator is located adjacent the rear end of the tractor between the driving wheels 16 in operative proximity to a steering wheel 20 carried by a rearwardly extending steering column 22. A gear shift lever 24 in accessible position extends upwardly from the forward part of a combined differential rear end and transmission housing 26. Immediately below the front of the housing 26 is a drawbar connection 28, the relation of which to the tractor will be further explained.

Figure 2:
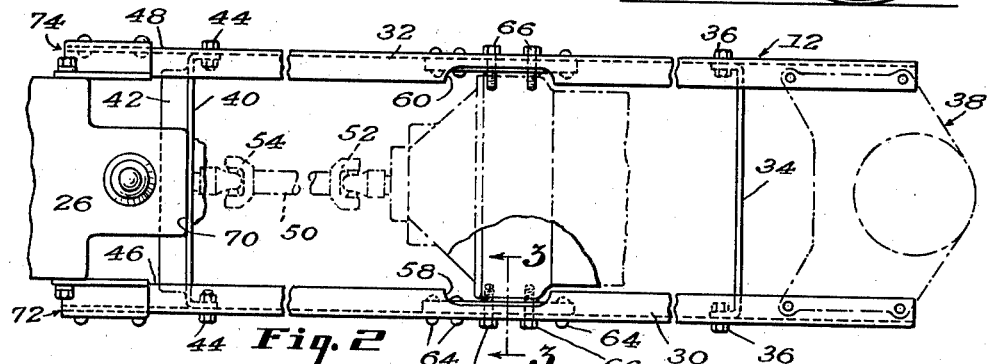
Fig. 2 is an enlarged top plan view of the tractor frame and several other chassis members.
Figures 3, 4, 5, 6:
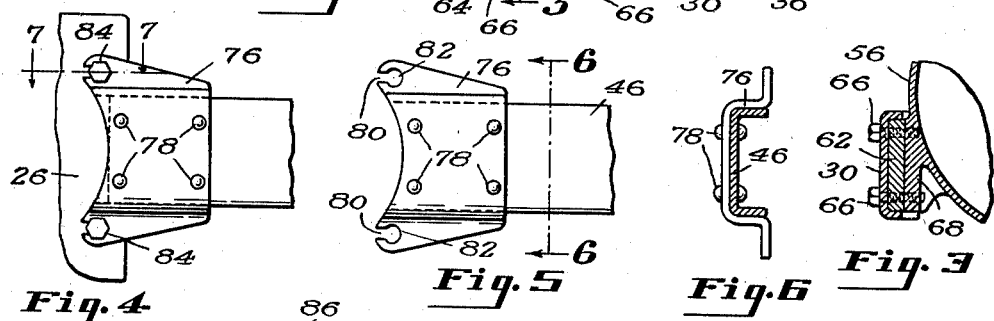
Fig. 3 is a detailed cross-section of the tractor construction taken at the line 3—3 of Fig. 2.
Fig. 4 shows in side elevation the detachable connecting means at the rearward end of the frame.
Fig. 5 is a corresponding side elevation showing of one part of the connecting means.
Fig. 6 represents a transverse cross-section on the line 6—6 of Fig. 5.

Fig. 2 serves best to illustrate the details of frame 12 which includes a pair of longitudinal frame members 30 and 32 which are disposed in spaced parallel relation. It is preferred that the frame members 30 and 32 be of the channel shape illustrated in Fig. 3. A forward transverse frame member 34 is rigidly secured to the longitudinal frame members 30 and 32 by means such as bolts 36, and is disposed somewhat rearwardly of the forward end of the frame 12 in order to accommodate a front wheel support and transverse frame member indicated generally as 38. Somewhat in advance of the rear end of the frame 12 is an additional transverse frame member 40 having a depending angle portion 42 for carrying the drawbar connection 28. A suitable number of bolts 44, 44 may be employed in securing the frame member 40 rigidly to the longitudinal channel members 30 and 32.

Particular attention is directed to the free or cantilever end portions 46 and 48 of the longitudinal frame members 30 and 32, respectively. It will be observed from Fig. 2 that the combination housing 26 fits closely within the end portions 46 and 48 in proper alignment with a drive shaft 50 located above the general plane of the frame 12. Separable universal connections 52 and 54 of conventional construction join the crank shaft of the engine 10 to the main shaft of the transmission within housing 26.

An enlarged and generally circular fly wheel housing portion 56 of engine 10 is fitted into opposite notched portions 58 and 60 of the longitudinal channel frame members 30 and 32 in the manner shown by Fig. 2. The connection between the frame 12 and the engine housing portion 56 will be understood from a consideration of Fig. 3, in which a stiffening and bearing member 62 mates with the inner side of channel frame member 30, being secured thereto by means such as the rivets 64 of Fig. 2 and carrying a suitably spaced number of inwardly extending cap screws 66 which threadedly engage a vertical, integral lug 68 depending from the flywheel housing portion 56. The opposite side of housing portion 56 is provided with a similar lug and is correspondingly secured to the frame member 32.

Reverting to the combined rear end and transmission housing 26, it will be seen that this housing has a forward end 70 in abutting relation to the transverse frame member 40 and that detachable connections designated generally as 72 and 74 join the housing 26 to the cantilever end portions 46 and 48. By virtue of the relationship which has just been indicated, the backward pull on the drawbar connection 28 has no tendency to separate the connections 72 and 74.

Figure 7:
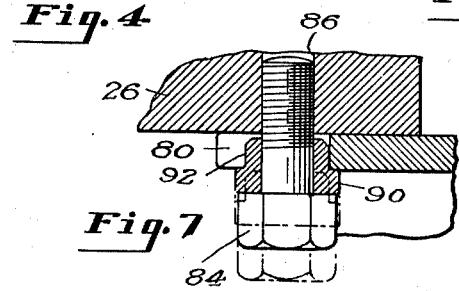
Fig. 7 is an enlarged longitudinal section taken along the line 7—7 of Fig. 4.
Figure 8:
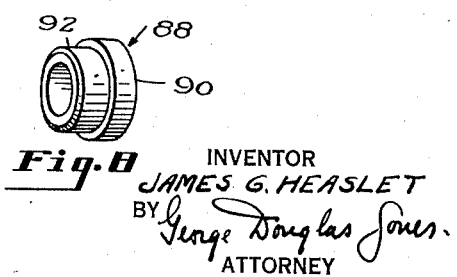
Fig. 8 shows a side perspective view of an element of the connecting means.

Reference is now made to Figs. 4 to 8 which show the details of connection 72, those of connection 74 being correspondingly similar. A plate member 76, which may be given a trough shape to fit snugly over the end portion 46 of the longitudinal frame member 30, is secured thereto as by rivets 78 and provided on its rearward edge with a vertically spaced pair of open slots 80, 80 having circular and enlarged bottom portions 82, 82. Each slot has a cap screw 84 passing therethrough and engaged a tapped hole 86 in the member or housing 26 (Fig. 7). A sleeve 88 is slidably fitted on the shank of each screw 84 and formed to provide an external, circular shoulder 90 of greater diameter than the circular slot portion 82 and a smaller tubular portion 92 on its inner end which fits the said circular slot portion 82. Accordingly, when the screws 84 are withdrawn to the dotted line position of Fig. 7, the open ends of the slots 80, 80 may be slid over their respective shanks. Insertion of the smaller sleeve portion 92 in the circular slot portion 82 will prevent withdrawal of the plate 76, and this position will be maintained by the clamping action exerted by the external shoulder 90 of said sleeve upon the adjacent portions of the plate member 76. The rigidity of the connection 72 necessary to insure against relative movement between member or housing 26 and plate 76 is attained by the use of a spaced pair of slots and securing means. Obviously, however, one such slot and associated securing means may find utility for other purposes.

As pointed out herein, the manner of connecting the engine crank case directly to the tractor frame produces a strong and simple construction which aids in positioning the engine drive shaft and the bottom of said crank case out of the way of agricultural implements which may be mounted beneath the tractor chassis. The combination of rear end differential and transmission within a single housing and the detachable association of that housing with projecting end portions of the chassis frame produces a driving end assembly which improves the design of such tractors and makes it easy to dismount the rear end and transmission from the engine drive shaft. provision has also been made for application of the drawbar load in a way which does not tend to produce separation of the detachable rear end connections. From this illustrated disclosure, it follows that economies in manufacture and improvements in general utility have been effected without any sacrifice of total efficiency.

Those skilled in this art will appreciate that various changes may be made in the invention as herein disclosed which will come within the spirit and scope of the appended claims.

Having thus described my invention, what I claim as novel and desire to secure by Letters Patent of the United States is:

1. The tractor combination comprising a generally rectangular body frame including a rear transverse frame member and a pair of parallel end portions projecting as cantilevers rearwardly of said transverse frame member; an engine including a crankcase mounted on the frame; threaded means connecting the crankcase of said engine directly to opposed intermediate side portions of the frame; a drive shaft extending rearwardly from the engine and above the frame; and a combined rear end and transmission housing detachably connected to the end portions of the frame with its front end abutting said transverse frame member and having the drive shaft operatively joined therewith.

2. In a wheel mounted, agricultural type tractor construction, a generally rectangular body frame having a pair of cantilever end portions extending rearwardly as continuations thereof; an engine including a crankcase mounted on the forward part of said frame and arranged thereabove to provide maximum clearance, the crankcase of said engine being provided with a vertical lug on opposite sides of its rearward portion; threaded connecting means extending through opposite sides of the body frame and into said lugs; an engine drive shaft projecting rearwardly from the crankcase of the engine in a plane which is above the frame; a rear end and transmission housing positioned between the end portions of the frame and having the drive shaft operatively joined therewith; and detachable connecting means arranged to secure the housing to the end portions of the frame.

3. A tractor combination comprising a generally rectangular body frame provided with a pair of parallel end portions projecting as cantilevers from its rearward end; an engine including a crank case mounted on the frame; threaded means connecting the crank case of said engine directly to opposed intermediate side portions of the frame; a drive shaft extending rearwardly from the engine and above the frame; a combined rear end and transmission housing detachably connected to the end portions of the frame and having the drive shaft operatively joined therewith, the said projecting portions of the body frame each having a plate provided with a rearwardly opening slot secured thereto, and the slots being enlarged and circular at their bottom portions; a round, externally shouldered sleeve for each slot, a smaller portion of said sleeve being arranged snugly to fit within the respective circular bottom portions of the plate slots; and a cap screw passing loosely through each of the sleeves and into the transmission housing so as to hold the sleeves tightly in contact with the plates of the frame and in rigid contact with the transmission housing.

4. The subcombination comprising a housing member having a spaced pair of tapped holes therein; a plate formed with a pair of correspondingly spaced open slots in one edge and comprising part of a chassis frame, said slots each being enlarged and circular at its bottom portion; a cap screw passing through each slot of the plate and threadedly engaging the member; and an externally shouldered sleeve mounted upon the shank of each screw, the smaller portion of said sleeves being arranged snugly to fit within the respective circular bottom portions of the plate slots and the larger portion to clamp the respective adjacent outer surface of said plate when forced into engagement by the heads of the screws, whereby the housing member may be detachably and rigidly secured to the plate of said chassis frame.

5. The subcombination comprising a member having a tapped hole therein; a plate formed with an open slot in one edge, said slot being enlarged and circular at its bottom portion; a cap screw passing through the slot of the plate and threadedly engaging the member; and an externally shouldered sleeve mounted upon the shank of the screw, the smaller portion of said sleeve being arranged snugly to fit within the circular bottom portion of the plate slot and the larger portion to clamp the adjacent outer surface of said plate when forced into engagement by the head of the screw.

JAMES G. HEASLET.